United States Patent [19]

Müllenberg

[11] Patent Number: 5,269,622

[45] Date of Patent: Dec. 14, 1993

[54] TAPER CLAMPING UNIT

[76] Inventor: Ralph Müllenberg, Im Wiesengrund 6, D-4048 Grevenbroich 12, Fed. Rep. of Germany

[21] Appl. No.: 838,267

[22] PCT Filed: Nov. 15, 1990

[86] PCT No.: PCT/DE90/00878

§ 371 Date: Mar. 12, 1992

§ 102(e) Date: Mar. 12, 1992

[87] PCT Pub. No.: WO91/07600

PCT Pub. Date: May 30, 1991

[30] Foreign Application Priority Data

Nov. 18, 1989 [DE] Fed. Rep. of Germany ....... 3938445
Mar. 8, 1990 [DE] Fed. Rep. of Germany ....... 4007332

[51] Int. Cl.$^5$ ............................................. F16D 1/06
[52] U.S. Cl. ................................ 403/370; 403/16
[58] Field of Search ............... 403/370, 365-369, 403/371, 374, 314, 16, 409.1

[56] References Cited

U.S. PATENT DOCUMENTS

| 2,570,604 | 10/1961 | Siegerist | 287/52 |
|---|---|---|---|
| 2,849,886 | 9/1958 | McCloskey | 403/370 X |
| 3,957,381 | 5/1976 | Schafer | 403/16 |
| 3,958,888 | 5/1976 | Mullenberg | 403/13 |
| 4,053,244 | 10/1977 | Dively | 403/13 |
| 4,268,185 | 5/1981 | Mullenberg | 403/370 X |
| 4,348,132 | 9/1982 | Mullenberg | 403/371 X |
| 4,557,621 | 12/1985 | Mullenberg | 403/370 X |
| 4,573,825 | 3/1986 | Mullenberg | 403/371 X |
| 4,846,761 | 7/1989 | Weiss | 464/69 |

FOREIGN PATENT DOCUMENTS

| 924407 | 3/1955 | Fed. Rep. of Germany . | |
|---|---|---|---|
| 1162640 | 2/1964 | Fed. Rep. of Germany . | |
| 1190266 | 11/1965 | Fed. Rep. of Germany . | |
| 1963480 | 6/1971 | Fed. Rep. of Germany . | |
| 7013424 | 9/1971 | Fed. Rep. of Germany . | |
| 2419933 | 7/1975 | Fed. Rep. of Germany . | |
| 2444104 | 12/1976 | Fed. Rep. of Germany . | |
| 2537016 | 3/1977 | Fed. Rep. of Germany | 903/370 |
| 3641547 | 7/1988 | Fed. Rep. of Germany . | |
| 109223 | 8/1966 | Norway . | |
| 582314 | 11/1976 | Switzerland | 403/369 |
| 706999 | 4/1954 | United Kingdom | 403/370 |
| 1417107 | 12/1975 | United Kingdom . | |

*Primary Examiner*—Randolph A. Reese
*Assistant Examiner*—Harry C. Kim
*Attorney, Agent, or Firm*—Foley & Lardner

[57] ABSTRACT

A taper clamping unit includes a tightening assembly having first and second taper rings, one of which is mounted on a cylindrical bushing. The cylindrical bushing has an end flange which extends opposite projecting portions of a plurality of screws which are used to connect, tighten, and untighten the first and second taper rings to each other. When the screws are loosened, the projections bear against the end flange such that the first and second taper rings are loosened from each other and when the screws are tightened, the projections bear against the first taper ring thereby tightening the first and second taper rings with respect to each other.

12 Claims, 3 Drawing Sheets

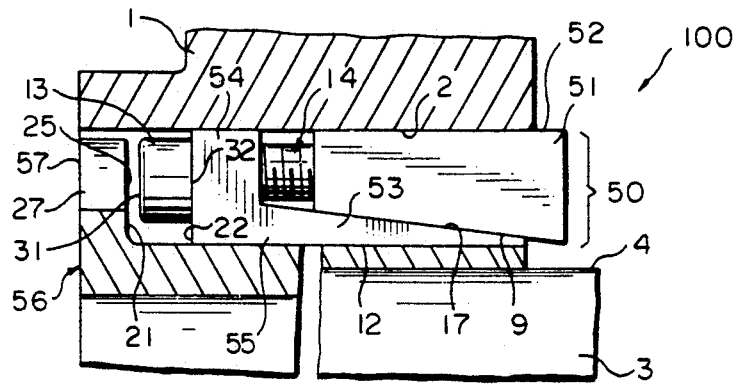
FIG. 1
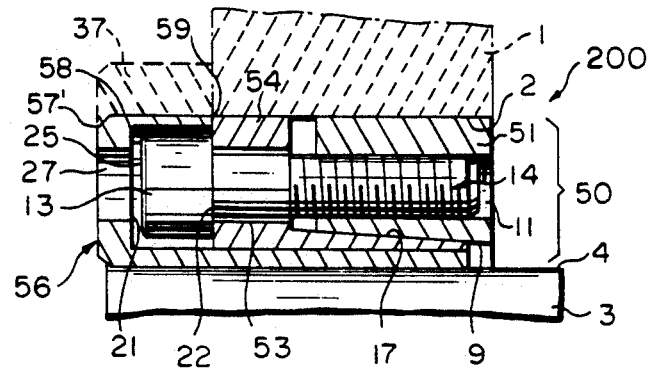
FIG. 2
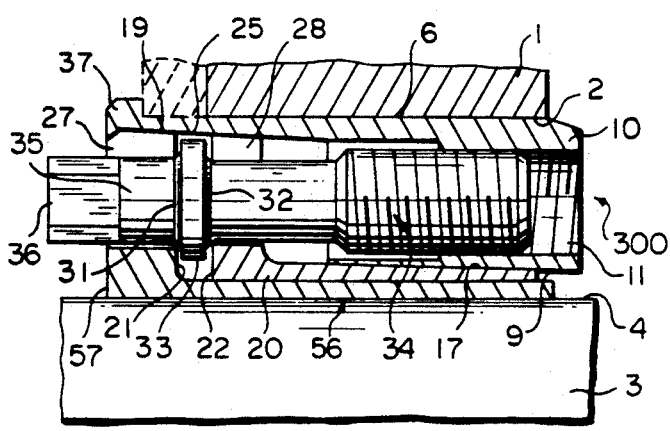
FIG. 3
FIG. 4

TAPER CLAMPING UNIT

BACKGROUND

British Patent Specification 1,417,107 discloses a taper clamping unit having two interacting taper rings. One of the taper rings has a radial flange in which axial clamping screws are arranged which with their head ends partly overlap the other taper ring, and with the margin of the head engage on one side in an outer peripheral groove of the other taper ring. When the clamping screws are tightened or released, the heads lie against one or the other flank of the peripheral groove.

This taper clamping unit is not suitable for exerting great forces since the screws are only supported on one side with the margin of their heads and high surface pressures at the bearing point as well as bending moments result.

German Patent Specification 924,407 and U.S. Pat. No. 2,570,604 disclose taper clamping arrangements which do not represent self-contained taper clamping units but have similar features.

DE-A 2,444,104 discloses another known clamping unit.

SUMMARY OF THE INVENTION

An object of the invention is to develop a congeneric taper clamping unit in such a way that it is simple and variable and is able to transmit greater forces in a purely frictional manner.

This object is achieved by providing a taper clamping unit, having a longitudinal axis being disposed in an intermediate space defined between a cylindrical recess of an outer component and a cylindrical outer peripheral surface of an inner component, for clamping and unclamping the inner and outer components to and from each other, respectively. The taper clamping unit includes:

a first taper ring having a tapered peripheral surface, a flank which is perpendicular to the longitudinal axis, and a cylindrical peripheral surface;

a second taper ring having a tapered peripheral surface which bears on the tapered peripheral surface of the first taper ring, a plurality of taped holes which are parallel to the longitudinal axis and disposed around a periphery of said second taper ring, and a cylindrical peripheral surface, the respective tapered peripheral surface of the first and second taper rings having an identical taper angle;

a plurality of screws each having a shank and a peripheral projection, the peripheral projection including first and second opposing bearing surfaces which are each perpendicular to the longitudinal axis and which project radially beyond the shank, wherein said threads of each of the screws engage a respective one of the tapped holes;

a cylindrical bush bearing on at least one of the cylindrical peripheral surfaces of the first and second taper rings and having a radial end flange with a flank that is perpendicular to the longitudinal axis such that the flank of the end flange and the flank of the first taper ring define a recess therebetween in which the peripheral projections are disposed; and wherein at times when the screws are tightened, the second bearing surface bears against the flank of the first taper ring producing first axial forces and the flank of the first taper ring withstands the first axial forces such that at least one of the tapered peripheral surfaces of the first and second taper rings slides relative to the other of the tapered peripheral surfaces of the first and second taper rings thereby clamping the inner and outer components together, and at times when said plurality of screws are unscrewed, the first bearing surface bears against the flank of the radial end flange and produces second axial forces, and the flank of the radial end flange withstands the second axial forces such that at least one of the tapered peripheral surfaces of the first and second taper rings slides relative to the other of the tapered peripheral surfaces of the first and second taper rings thereby unclamping the inner and outer components from each other.

Owing to the fact that the flanks of one taper ring or of the cylindrical bush extend in each case in front of large portions of the bearing surface of the relevant peripheral projection, the peripheral projection has an abutment almost over the full area on both bearing surfaces in both directions of rotation. As a result of the abutment, the surface pressures on the bearing surfaces are reduced on the one hand and the peripheral projection is stressed symmetrically on the other hand so that no bending forces are exerted on the screws. The flanks of the recess are to extend over the bearing surfaces in such a way as to be "supported against axial forces", i.e. they are to be robustly supported at the rear by appropriate proportioning of the material quantities so that they can also absorb forces. Flanks formed on sheet-thin side parts do not fulfill the purpose of the invention.

Due to the invention, the screw is given axial abutment in both directions of rotation, which abutment is able to transmit forces of comparable magnitude. The screws serve both as clamping screws and as release screws. Thus, space no longer has to be left for separate release screws as was usually the case in the previously known taper clamping connections. The space obtained can be utilized for additional screws which used to increase the overall axial force which is applied overall. The clamping unit is not released by the release screws acting with their end against a bearing surface, as is conventional in the case of the known constructions. Instead, the transmittable forces are small and there is a risk of damage to the release screws. In contrast, the clamping unit of the invention is released while transmitting the forces on the bearing surface of the peripheral projection, i.e. on a much larger area with correspondingly reduced surface pressure. In addition, all screws present are available for applying the release force. The increased release forces, which are quite comparable with the clamping forces, enable especially small taper angles down to 2° to be used. At small taper angles, the efficiency of conversion of the axial clamping forces into radial clamping forces is especially high, i.e. especially high torques can be transmitted with identical axial clamping forces by pure frictional connection.

The recess serving to accommodate the peripheral projection, that is, for example, the head of the screw, is formed by two parts separate from one another. One flank of the recess is formed by the end face of a taper ring and the other flank of the recess is formed by one side of the end flange of the inner or outer bush. This has the advantage that, on the one hand, a diametral adaptation without changing the taper components can be made by inner or outer bushes of different dimensions and that, on the other hand, standard taper clamping units already on the market or in use can be used in the manner according to the invention by adding the inner or outer bushes.

On the whole, the invention results in a taper clamping unit of especially high efficiency which can easily be released. The transmittable torque per unit of weight is substantially higher than in known embodiments.

Annular disks are advisable in order to minimize the friction losses at the bearing surfaces of the peripheral projection of the screws. These annular disks can, for example, be disks made of hardened steel which are treated with a solid lubricant.

The recess should accommodate the peripheral projection in the axial direction with only slight clearance. This provides in particular a safety means when tightening the taper clamping arrangement. In the case of the conventional taper clamping arrangements, given the multiplicity of screws distributed over the periphery, a certain tightening system had to be carefully adhered to in order to prevent the taper clamping arrangement from being pulled askew by excessive tightening on one side. When a screw is tightened at the narrow recess space according to the invention and has brought about a certain axial displacement of the taper components relative to one another, the adjacent screws, after a slight distance in the region of 0.3 to 2.0 mm, butt with the other side of their peripheral projection against the other flank of the recess and thereby block further or excessive tightening of the first-mentioned screw. This of its own accord results in an inevitable evening-out of the tightening of the screws.

In an important embodiment of the invention, the peripheral projection is the head of a socket-head cap screw.

An alternative to the socket-head cap screw is a type of special screw in which the shank extends from the peripheral projection to both sides.

In yet another embodiment, the recess has a radially opening aperture for the screw shank. The aperture is to be provided on one side or both sides of the recess depending on whether the screw is a cap screw or a screw "on both sides".

Moreover, the end flange may include blind holes such that the end flange of the inner or outer bush can be made substantially thicker so that a deformation by the axial release forces is counteracted.

In a further development the margins of the blind holes bear against the end face of one taper ring which results in a type of encapsulation of the peripheral projections or screw heads which prevents contamination and corrosion.

Special embodiments of clamping arrangements having additional cylindrical bushes are also possible the common advantage of these embodiments consists in the fact that no displacement of the outer component relative to the inner component in the axial direction takes place when the clamping unit is tightened, and the clamping units can always be released in a positive manner.

BRIEF DESCRIPTION OF THE DRAWINGS

Exemplary embodiments of the invention are shown in the following drawings wherein:

FIG. 1 shows a partial section, passing through the axis, of a first embodiment of a clamping unit.

FIGS. 2 and 3 show representations corresponding to FIG. 1 of further embodiments.

FIG. 4 shows a partial view according to FIG. 3 with a detail change.

DETAILED DESCRIPTION OF THE PREFERRED EMBODIMENT

Figure 5:
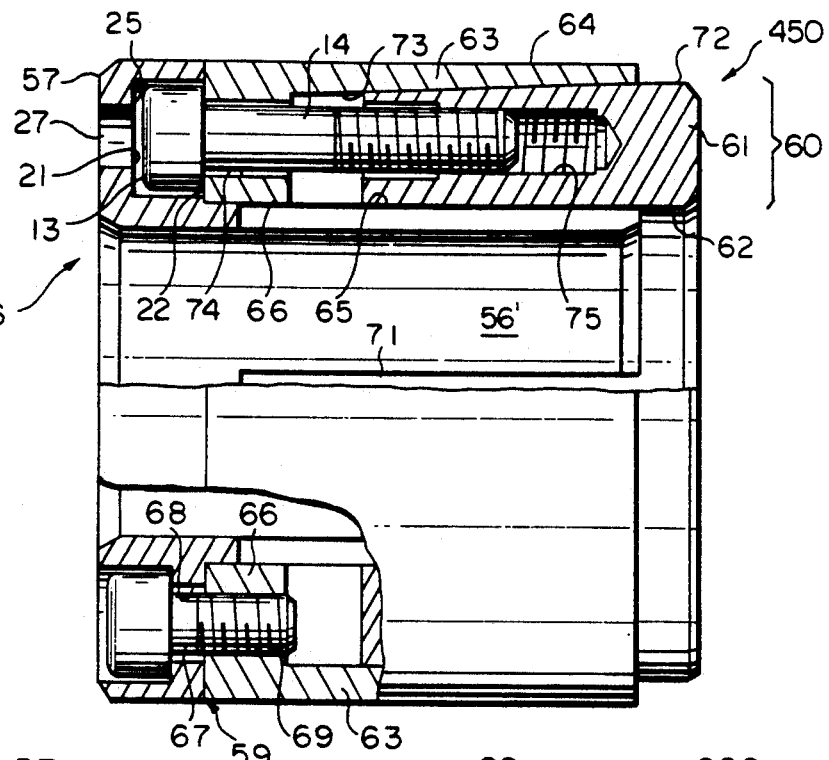
FIGS. 5 to 7 show sections, passing through the axis, of further embodiments designed as clamping units, the inner and the outer components being omitted.

The clamping unit 100 in FIG. 1 serves to frictionally secure an outer component 1 having a cylindrical recess 2 to an inner component, for example a shaft 3, having a cylindrical outer periphery 4. The recess 2 and the outer periphery 4 are arranged concentrically to one another and leave a cylindrical intermediate space between them.

The clamping unit 100 is arranged in this intermediate space.

The clamping unit 100 in FIG. 1 comprises a thick-walled taper ring 51 which rests with its cylindrical outer peripheral surface 52 in the recess 2 of the outer component 1, has a tapered inner peripheral surface 9 and contains axial tapped holes into which screws 14 are screwed. In contrast, the inner taper ring 53 is designed to have a thinner wall and has a tapered outer peripheral surface 17 which has the same taper angle (lying in the self-locking range) as the taper surface 9 and bears on the latter. Furthermore, a flange 54 is provided at its thick-walled end, which flange 54 extends from the end face of the taper ring 51 located at the thin-walled end of the same and through which the screws 14 pass, the heads 13 of which bear from the outside against the outer flank 22 of the flange 54.

The taper rings 51, 53 together form a conventional clamping unit 50. However, the cylindrical inner periphery 12 of the taper ring 53 does not sit as usual on the outer periphery 4 of the shaft 3 but on the outer periphery 55 of a cylindrical bush 56 which, axially outside the screw heads 13, has a radial flange 57 which has a flank 21 which is perpendicular to the axis on the side of the screw heads 13 and which extends radially up to the outer margin of the screw heads 13 and also contains apertures 27 through which a turn tool can be passed for engaging on the screw heads 13. The apertures 27 are just wide enough for a turn tool to be inserted from outside into the hexagon recess of the screw head 13 such that it can be turned (FIGS. 1 and 2) or for the screw shank 35 to just pass through (FIG. 3). A recess 25 for accommodating the screw heads 13 is formed between the flanks 21 and 22 of the flanges 57 and 54.

Each screw head 13 forms a peripheral projection which is supported in the recess 25 in both axial directions. Here, the top side of the screw head forms a bearing surface 31 which can interact with the flank 21 of the recess 25, and the underside of the screw head 13 forms a bearing surface 32 for the flank 22.

If the screw 14 is tightened, the taper rings 51, 53 are moved towards one another and the taper-surface pairs 9, 17 slide down on one another. In the exemplary embodiment, the taper angles are around 3°. Due to the sliding-up movement via the taper surfaces, the clamping unit expands radially and thereby clamps the outer component 1 in place on the shaft 3.

If the clamping screws 14 are released again after fastening is effected, the clamping unit 100 remains fastened, since the taper angles are self-locking. To release the clamping unit 100, it is thus necessary to apply a separate axial release force. This is done by the screws 14 being unscrewed further until they bear on the flank 21 of the recess 25 with the bearing surface 31 formed by the outer side of the screw head 13. During the further unscrewing, the taper ring 51 is consequently pushed away from the taper ring 53 and the clamping unit 100 is released. The screws 14 thus serve both to clamp and to release the clamping unit 100. They can be arranged close together over the periphery of the flange 18 so that the entire space available can be utilized for applying axial forces.

In the exemplary embodiment, the width of the recess 25 between the flanks 21 and 22 is only about 1 mm greater than the axial extent of the screw head 13 and the annular disk 16. Consequently, if a certain screw 14 is tightened and has carried the taper ring 53 with it by this one millimeter, the adjacent screws butt with the outer bearing surfaces 31 against the flanks 21 of the recesses 25, and in this way limit further tightening of the first screw 14. In this way, skewed tightening of the clamping unit 100 upon fastening is prevented.

The clamping unit shown has an especially low power-to-weight ratio, i.e. the clamping-unit weight which is required for transmitting a certain torque is especially low. This comes about owing to the fact that a particularly large number of screws can be used, since no space is lost for separate release screws, and the fact that work is possible using especially small taper angles, since the pushing-off forces that are necessary, which of course are now applied by the same screws, can easily be obtained.

The bush 56 can have various inside diameters in order to permit an adaptation to various shaft diameters, as indicated in the left-hand and right-hand halves of FIG. 1. The advantage of this embodiment consists in the fact that standard components can be used for the clamping unit 51, 53.

In so far as cross-sectional areas are not hatched, this means that the relevant taper ring is to be slit at one location in order to make it flexible and to avoid clamping-force losses of the screws 14.

Functionally corresponding parts are identified by the same reference numerals in the further exemplary embodiments.

The difference between the embodiment 200 in FIG. 2 and the embodiment 100 in FIG. 1 is that, in the embodiment 200 in FIG. 2, the flange 57' of the bush 56 is thick-walled in the axial direction and has blind holes 58 which accommodate the heads 13 of the screws 14 and form the recesses 25. The flange 57' bears on the end face or flank 22 of the flange 54 so that the screw heads 13 are to some extent encapsulated and protected.

In the clamping unit 200, the flange 57' can have a radial extension 37 on which the outer component 1 bears so that it does not move in the axial direction relative to the shaft 3 during fastening.

In the embodiment 300 according to FIGS. 3 and 4, the screw 34 is not a cap screw but engages in the recess 25 with a cylindrical peripheral projection 33 concentric to the axis, the screw shank 35 extending to the outside and ending in an external hexagon 36 which is located in front of the outer end face of the flange 18 and on which a turn tool acts.

Here, too, the taper surface 19 forming the outer peripheral surface of the flange 18 can have an extension 37 which projects radially to the outside and on which the outer component 1 comes to bear in the axial direction. When the clamping unit 300 is being fastened, slipping additionally takes place here on the cylindrical surfaces 2, 6, in the course of which, however, the outer component 1 does not shift in the axial direction relative to the shaft 3, which is desirable in some cases.

It is indicated in FIG. 4 that the peripheral projection 33 in the recess 25 can be [lacuna]on both sides with friction-reducing disks 16 of hardened steel treated with solid lubricant. Such disks 16 can also be provided on one side as washers in the embodiments according to FIGS. 1 to 3.

In the embodiment 450 in FIG. 5, a bush 56 designed as an inner bush is provided which comprises a thin-walled cylindrical part 56' which is intended for bearing with its cylindrical inner peripheral surface on the shaft (not shown) and has a cylindrical outer peripheral surface 65. An end flange 57 projecting radially to the outside is provided on the left-hand end in FIG. 5, in which end flange 57 the recess 25 is formed which consists either of individual cylindrical recessed portions which are allocated to the head 13 of each clamping screw 14 or of a groove which is continuous over the periphery and into which the heads 13 project. A recess 27 for a turn tool to reach through is made opposite the heads 13.

As already mentioned, the cylindrical part 56' is thin-walled and in addition has longitudinal slots 71 which extend according to FIG. 5 from the right up to just in front of the end flange 56 and are intended to increase the flexibility so that not too much clamping force of the screws 14 is lost for the pure deformation of the parts of the clamping unit.

A radially thick-walled taper ring 61 is arranged with its cylindrical inner peripheral surface 62 on the cylindrical outer side 65 of the thin-walled part 56' of the bush 56, the expression "thick-walled", as in all other exemplary embodiments, here being intended to mean that the radial extent is large enough to be able to accommodate an axial bore (closed all round) for the clamping screws 14.

With its outer taper surface 72 having a taper angle lying in the self-locking range, the taper ring 61 bears on the inner taper surface 73 of a thin-walled taper ring 63, the cylindrical outer peripheral surface 64 of which is intended for bearing in a corresponding bore of an outer component (not shown).

On the left-hand end in FIG. 5, the taper ring 63 has a flange which projects radially to the inside and engages radially from outside between the right-hand end face of the end flange 65 [sic]and the left-hand end face of the taper ring 61. The axial screws 14 pass through the flange 66 in through-holes 74 and engage in tapped holes 75 of the taper ring 61.

The parts 61, 63, 14 form a conventional clamping unit 60 inside the clamping unit 450, which interacts with the bush 56 and can be combined with bushes 56 of various wall thickness so that an appropriate range of shaft diameters can be covered.

When the screws 14 are tightened, the taper ring 61 is drawn in between the taper ring 63 and the cylindrical part 56' of the bush 56. In the process, the cylindrical inner peripheral surface of the part 56' and the outer peripheral surface 64 of the taper ring 63 do not shift in the axial direction, which is an important advantage in so far as the components to be fastened to one another retain their axial position, which is set once only.

So that the bush 56 is not carried along to the left according to FIG. 5 by the taper ring 61 when the screws 14 are tightened, connecting screws 67 are provided at at least two locations distributed over the periphery, which connecting screws 67 can be actuated from the same side as the screws 14, pass through through-holes 68 in the flange 57 and engage in tapped holes 69 in the flange 66 of the taper ring 63. The flanges 66, 57 are thus held in contact at the end face 59 so that the abovementioned displacement of the bush 56 to the left cannot occur.

The connecting screws 67 also perform a function during release. When the screws 14 are unscrewed for this purpose, the outer component, while the fastening is maintained, could be pushed down together with the taper ring 63 and the taper ring 61 by the cylindrical part 56' of the bush 56. As a result, the flange 66 would move away from the flange 57, which is prevented by the connecting screws 67. The outer component and the clamping unit 60 cannot therefore be displaced "as a pack"; on the contrary, positive release of the clamping unit 60 and thus of the entire clamping arrangement 450 is effected upon appropriate actuation of the screws 14.

Figure 6:
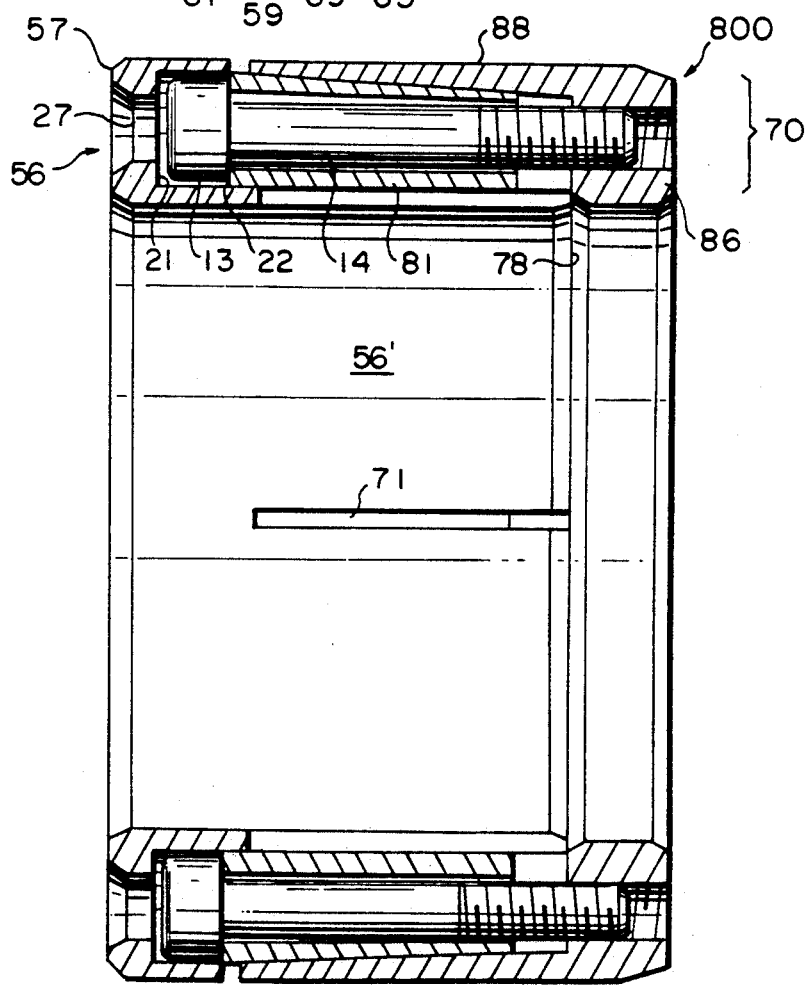

In the embodiment 800 in FIG. 6, a thick-walled taper ring 71 [sic]which faces the end flange 57 with the end face of its thick-walled end is arranged on the thin-walled part 56' of the bush 56. Sitting on the taper ring 81 is a thin-walled taper ring 88 whose flange 86, provided at the right-hand end according to FIG. 6, projects radially to the inside, to be precise down to the end face 76 of the part 56' of the bush 56. The taper rings 81, 88 form a conventional clamping unit 70.

When the screws 14 are tightened, the thick-walled taper ring 81, in contrast to the embodiment 450, is driven in from left to right between the part 56' of the bush 56 and the thin-walled taper ring 88. On account of the bearing on the end face 76, the taper ring 88 in effect maintains its position relative to the shaft (not shown) so that here, too, the axial position, set once, of the components relative to one another is not changed by the tightening operation.

Figure 7:
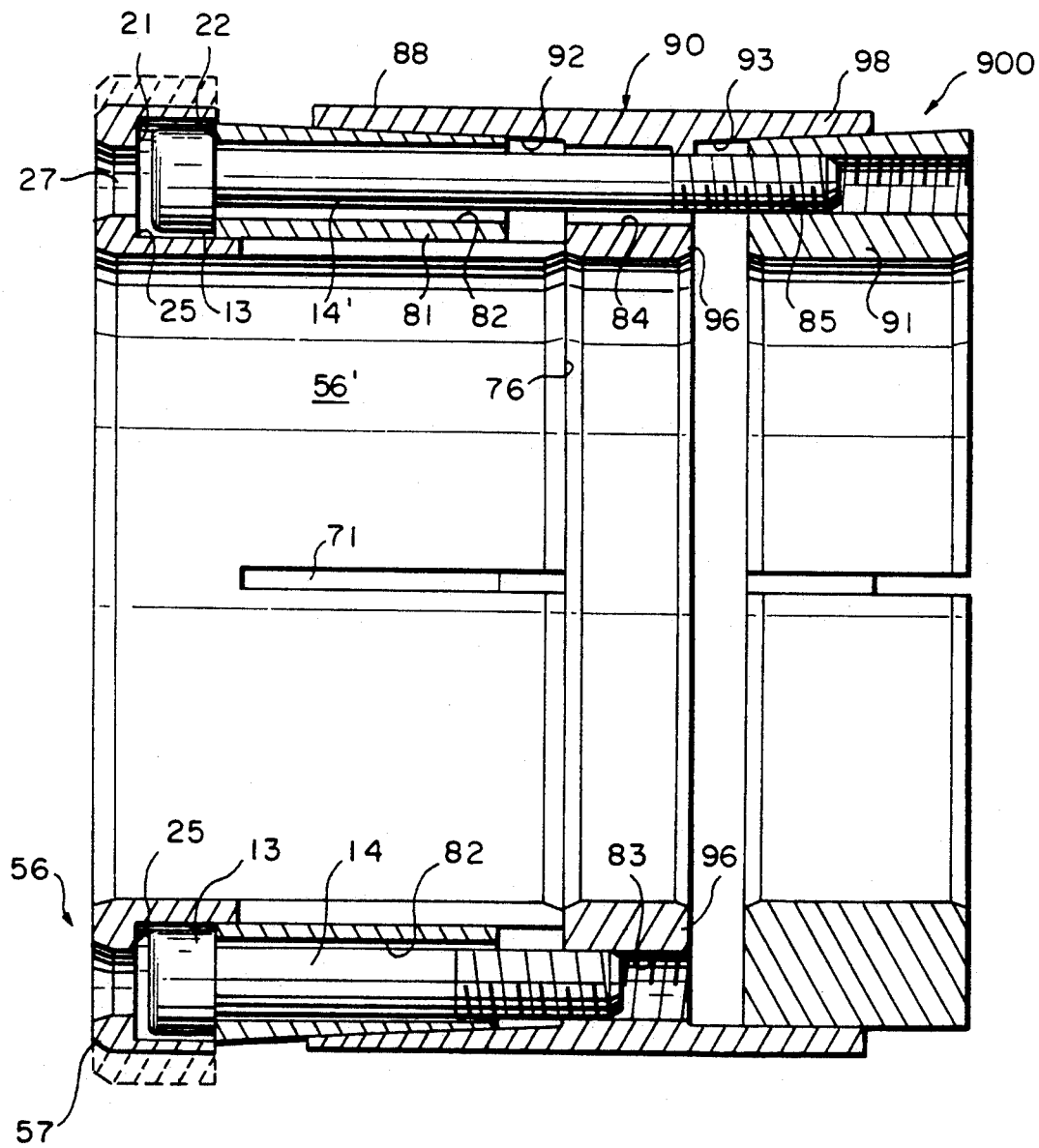

In the embodiment 900 in FIG. 7, compared with the embodiment 800 in FIG. 6, another taper-ring arrangement has been added to the right-hand side there. Otherwise, however, the embodiment 800 on the left-hand side in FIG. 7 is completely included in the embodiment 900, and the parts accordingly have the same reference numerals. The taper ring 88 is completed to form a double-taper ring 90 by a taper-ring part 98 being added to the right-hand side. Overall, the double-taper ring 90 has a T-shaped configuration in a section passing through the axis, the flange 86 in FIG. 6 being turned into a center web 96 which sits in a sliding manner with its inner periphery on the shaft. The inner taper surface 93 of the taper-ring part 98 interacts with a thick-walled taper ring 91 which extends with its inner peripheral surface as far as the shaft (not shown).

There is a first set of screws 14 which pass through through-holes 82 in the first thick-walled taper ring 81 and engage in tapped holes 83 in the center web 86. The screws 14 fasten the taper rings 81 and 88.

There is a second set of clamping screws 14' which pass through through-holes 82 in the taper ring 81 and 84 in the center web 96 and engage in tapped holes 85 in the additional right-hand taper ring 91. The screws 14' fasten the taper rings 98 and 91.

During release, first of all the taper ring 91 is pushed off the taper ring 98 by means of the screws 14'. The screws 14 are then unscrewed and the taper rings 88 and 81 are pushed off. Connecting screws 67 as shown in FIG. 5 could be provided between the taper ring 81 and the end flange 57. However, it is also possible to make the taper angle of the taper surface 93 on the right-hand side in FIG. 7 slightly larger than that of the taper surface 92. When an axial force occurs, the taper ring 91 is then always first to be released.

With regard to the function of the recess 25 and the extension of its flanks 21, 22, all aforesaid embodiments correspond to the recess 25 in FIGS. 1 and 2.

I claim:

1. A taper clamping unit, having a longitudinal axis and being disposed in an intermediate space defined between a cylindrical recess of an outer component and a cylindrical outer peripheral surface of an inner component, for clamping and unclamping the inner and outer components to and from each other, respectively, the taper clamping unit comprising:
   a first taper ring having a tapered peripheral surface, a flank which is perpendicular to the longitudinal axis, and a cylindrical peripheral surface;
   a second taper ring having a tapered peripheral surface which bears on said tapered peripheral surface of said first taper ring, a plurality of tapped holes which are parallel to the longitudinal axis and disposed around a periphery of said second taper ring, and a cylindrical peripheral surface, said respective tapered peripheral surface of said first and second taper rings having an identical taper angle,
   a plurality of screws each having a shank, threads, and a peripheral projection, said peripheral projection including first and second opposing bearing surfaces which are each perpendicular to the longitudinal axis and which project radially beyond said shank, wherein said threads of each of said screws engage a respective one of said tapped holes;
   a cylindrical bush bearing on at least one of the cylindrical peripheral surfaces of said first and second taper rings and having a radial end flange with a flank that is perpendicular to the longitudinal axis such that said flank of said radial end flange and said flank of said first taper ring define a recess therebetween in which said peripheral projections are disposed;
   wherein at times when said screws are tightened said second bearing surface bears against said flank of said first taper ring producing first axial forces and said flank of said first taper ring withstands said first axial forces such that at least one of said tapered peripheral surfaces of said first and second taper rings slides relative to the other of said tapered peripheral surfaces of said first and second taper rings thereby clamping said inner and outer components together, and at times when said plurality of screws are unscrewed said first bearing surface bears against said flank of said radial end flange and produces second axial forces, and said flank of said radial end flange withstands said second axial forces such that at least one of said tapered peripheral surfaces of said first and second taper rings slides relative to the other of said tapered peripheral surfaces of said first and second taper rings thereby unclamping said inner and outer components from each other.

2. A taper clamping units as recited in claim 1, further comprising an annular disk which is disposed on at least one of said first and second bearing surfaces to facilitate a turning of said screws when one of said first and second axial forces are present.

3. A taper clamping unit as recited in claim 1, wherein the width of said recess between said flank of said end flange and said flank of said first taper ring is from 0.3 to 2.0 mm > the width of said peripheral projection.

4. A taper clamping unit as recited in claim 1, wherein said peripheral projection is a head of a socket-head cap screw.

5. A taper clamping unit as recited in claim 1, wherein said peripheral projection is disposed between first and second portions of said shank.

6. A taper clamping unit as recited in claim 1, wherein at least one of said flank of said first taper ring and said flank of said radial flange end has an aperture therein which opens radially to an outer surface thereof for accommodating said shank.

7. A taper clamping unit as recited in claim 1, wherein said radial end flange has a plurality of blind holes therein for accommodating said peripheral projections, said blind holes having a back portion which is the flank of said radial end flange.

8. A taper clamping unit as recited in claim 7, wherein margins of the blind holes bear against an end face of said first taper ring.

9. A taper clamping unit as recited in claim 1, wherein said first and second taper rings form a clamping unit, said first taper ring forms a cylindrical outer peripheral surface of said clamping unit and has a side which faces said end flange and which includes a radially projecting flange, said second taper ring is thick-walled and has a cylindrical inner peripheral surface which bears on an outer cylindrical peripheral surface of said cylindrical bush, said tapered peripheral surface of said second taper ring is an outer surface thereof and said first taper ring tapered peripheral surface is an inner surface thereof, said radially projecting flange having holes therein through which said screws pass.

10. A taper clamping unit as recited in claim 9, further comprising connecting screws which are shorter than said plurality of screws and which are disposed around the periphery of said radial end flange and which engage in said radially projecting flange.

11. A taper clamping unit according to claim 1, wherein said first and second taper rings form a clamping unit, said second taper ring forms a cylindrical outer peripheral surface of said clamping unit and has a side which is remoted from said end flange including a radially projecting flange which extends axially outside of an end of said cylindrical bush and radially downward to said end of said cylindrical bush, said first taper ring is thick-walled and has a cylindrical inner peripheral surface which bears on an outer cylindrical peripheral surface of said cylindrical bush, said taper peripheral surface of said first taper ring is an outer surface thereof and said second taper ring tapered peripheral surface is an inner surface thereof, said radially projecting flange having holes therein through which said screws pass.

12. A taper clamping unit as recited in claim 1, further comprising a thin-walled double taper ring having first and second tapered surfaces and a greatest wall thickness and a radial center web at its center relative to a direction along the longitudinal axis, said radial web extending axially outside an end of said cylindrical bush and radially downward toward a face of said cylindrical bush, and wherein said first and second taper rings and said double taper ring form a double taper clamping unit, aid first taper ring bears with its cylindrical peripheral surface on a cylindrical peripheral surface of said cylindrical bush and bears with its tapered peripheral surface on one of said first and second tapered surfaces of said double taper rings, said second taper ring bears with its cylindrical peripheral surface on a cylindrical peripheral surface of at least one of said inner and outer components and with its tapered peripheral surface on said other of said first and second surfaces of said double taper ring, and further comprising an additional plurality of screws each having a peripheral projection which are arranged on the radial end flange, said additional plurality of screws passing through a first set of through-holes formed in said first taper ring and engaging in additional tapped holes formed in said radial web, and wherein said plurality of screws pass through a second set of through-holes formed in said first taper ring and a third set of through-holes formed in said radial web.

* * * * *